United States Patent Office 2,999,882
Patented Sept. 12, 1961

2,999,882
METHOD OF PREPARING SECONDARY PHOSPHINES
Sheldon A. Buckler, Stamford, Conn., and Lois Doll, Adams, Mass., assignors to American Cyanamid Company, New York, N.Y., a corporation of Maine
No Drawing. Filed Aug. 31, 1959, Ser. No. 836,925
6 Claims. (Cl. 260—606.5)

The present invention relates to the preparation of organic scondary phosphines. More particularly the instant discovery concerns a method of preparing secondary phosphines, namely bis(2,2-dihalo-1-hydroxyalkyl)phosphines, having the formula $$\left( \begin{array}{c} X \\ | \\ R-C-CHOH \\ | \\ X \end{array} \right)_2 PH$$

wherein X is selected from the group consisting of chlorine and fluorine and R is a member chosen from the group consisting of H, Cl, F, lower alkyl ($C_1$-$C_4$), and monohalo-substituted lower alkyl, by bringing into intimate contact phosphine, an aqueous mineral acid, and an aldehyde conforming to the formula $$\begin{array}{c} X \\ | \\ R-C-CHO \\ | \\ X \end{array}$$

wherein X and R have the same meaning given above.

According to the instant discovery, a straightforward, simple and unprecedented method for preparing the secondary phosphines contemplated herein has been discovered. Among the many advantages of the present invention are the fact that very high yields of the secondary phosphines are produced which are readily recoverable from the reaction mass. The rate of reaction is superior, admits of good control, and is flexible. Quite unexpectedly, also, relatively pure yields of the secondary phosphines contemplated herein are obtained; in most cases, as will be seen hereinafter, the desired products are produced to the substantial exclusion of other derivatives, such as tertiary phosphines, and the like.

Pursuant to a particular embodiment of the present discovery, a solution of chloral hydrate is admixed with aqueous hydrochloric acid and, under substantially anaerobic conditions, gaseous phosphine is admixed with the solution. Product bis(2,2,2-trichloro - 1 - hydroxyethyl)phosphine, a white solid, is thus formed.

While the reactants are best brought together at temperatures in the range of 20° C. to 60° C., a wide range of temperatures on the order of 0° C. to 80° C. is contemplated herein. Likewise, reaction may be made to take place at atmospheric, sub-atmospheric, or super-atmospheric pressures. While pressures in the range of 1 to 150 atmospheres, or higher, are suitable, pressures from 2 to 5 atmospheres are preferred.

The reactants may be brought together in any desired sequence and the reaction process can be continuous, semi-continuous or batch.

It may be desirable at times to carry out the reaction contemplated herein in the presence of an inert, organic, water-miscible solvent, such as a monohydric lower alkyl alcohol (e.g., ethyl alcohol, methyl alcohol, and the like); a cyclic ether, such as tetrahydrofuran; a dialkyl ether of ethylene glycol, such as dimethyl ether; and the like. By inert solvent is intended a solvent which under the conditions of reaction does not react with the reactants.

As will be seen hereinafter, reaction can be effected using stoichiometric quantities of the reactants. In other words, at least about 2 moles of the aldehyde reactant per mole of phosphine provides the corresponding secondary organic phosphine. However, substantial excesses of either reactant may be employed without precluding the production of the desired secondary phosphines.

Aqueous mineral acids, such as HCl, $H_2SO_4$, $HNO_3$, and the like, at various concentrations may be employed. For example, as shown herein, concentrated HCl (aqueous HCl containing 37.7 percent HCl by weight) is very effective. On the other hand, dilute acids are suitable.

The products produced herein are useful as intermediates for preparing the corresponding secondary phosphine oxides. These oxides, in turn, may be employed as plasticizers for polyacrylonitrile.

For example, a liquid solution of the product of Example I, below, in tetrahydrofuran may be prepared and air bubbled therethrough for a period of about two hours at ambient temperature (20° C.–25° C.). The resulting and corresponding secondary phosphine oxide is then recovered. For a more comprehensive disclosure of a method for oxidizing secondary phosphine oxides of the general type contemplated herein, reference is hereby made to the copending application of Rauhut et al., U.S. Serial No. 752,167, filed July 31, 1958, now Patent No. 2,953,596.

The present invention will best be understood by virtue of the following examples which, while specific, are merely illustrative and are not intended to limit the scope of the invention:

EXAMPLE I $$2CCl_3CHO \cdot H_2O + PH_3 \rightarrow (CCl_3CHOH)_2PH$$

Reaction is conducted in a 250 milliliter pressure bottle connected to and in communication with a reservoir containing phosphine gas under 4 atmospheres pressure, the pressure bottle being maintained on a shaking device. A solution of 49.6 grams (0.3 mole) of chloral hydrate in a mixture of 150 milliliters of tetrahydrofuran and 50 milliliters of concentrated aqueous hydrochloric acid containing 37.7 percent HCl by weight is prepared and placed in the pressure bottle. The space above this solution is evacuated and filled with nitrogen gas, evacuated and filled with nitrogen gas several more times and finally evacuated. Phosphine gas from the reservoir is then admitted to the mixture and the pressure bottle and reaction carried out at ambient temperature for 1.5 hours under agitation provided by the shaking device. A total of 5.1 grams (0.15 mole) of phosphine is taken up. In this operation phosphine is supplied from the reservoir as needed. At the end of this period the space above the solution in the pressure bottle is again evacuated and filled with nitrogen several times. The resulting solution is then concentrated at a temperature of 50° C. and a pressure of 15 millimeters of mercury to give 52.3 grams (95 percent of the product theoretically producible) of product bis(2,2,2-trichloro-1-hydroxyethyl)phosphine as a white solid residue, melting point 120° C.–122° C. An analytical sample is prepared by washing this material with water, melting point 129° C–130° C.

Analysis calculated for $C_4H_5Cl_6O_2P$: C, 14.61; H, 1.53; P, 9.42; molecular weight; 328.8. Found: C, 14.99; H, 1.69; P, 9.30; molecular weight; 331.0.

EXAMPLE II

*Bis(2,2-dichloro-1-hydroxyethyl)phosphine*

$$2\ CHCl_2CHO + PH_3 \rightarrow (CHCl_2CHOH)_2PH$$

The procedure here is the same in every essential respect as described in Example I, above. A solution of 36.2 grams (0.32 mole) of dichloroacetaldehyde in a solution of 75 milliliters of water and 75 milliliters of concentrated aqueous hydrochloric acid is reacted at ambient temperature (20° C.–30° C.) with phosphine at 4 atmospheres pressure for 1.5 hours. A total of 5.45 grams (0.16 mole) of phosphine is taken up. The resulting solution is concentrated at a temperature of 40° C.–50° C. and 10 millimeters of mercury to give 37 grams of product bis(2,2-dichloro-1-hydroxyethyl)phosphine in the form of a pale orange liquid.

EXAMPLE III

*Bis(2,2,3-trichloro-1-hydroxybutyl)phosphine*

$$2CH_3CHClCCl_2CHO + PH_3 \rightarrow (CH_3CHClCCl_2CHOH)_2PH$$

The procedure of Example I, above, is repeated in every essential respect except that 52.5 grams (0.3 mole) of 2,2,3-trichlorobutyraldehyde is substituted for the chloral hydrate. The product is bis(2,2,3-trichloro-1-hydroxybutyl)phosphine, melting point 95° C.–96° C.

EXAMPLE IV

*Bis(2,2-dichloro-1-hydroxybutyl)phosphine*

$$2\ CH_3CH_2CCl_2CHO + PH_3 \rightarrow (CH_3CH_2CCl_2CHOH)_2PH$$

The procedure of Example I, above, is repeated in every essential respect using 42.2 grams (0.3 mole) of 2,2-dichlorobutyraldehyde in place of the chloral hydrate. The product is bis(2,2-dichloro-1-hydroxybutyl)phosphine, obtained as a white solid.

EXAMPLE V

*Bis(2,2,2-trichloro-1-hydroxyethyl)phosphine*

The procedure of Example I, above, is repeated in every essential respect using 150 milliliters of ethyl alcohol in place of the tetrahydrofuran. The product is bis(2,2,2-trichloro-1-hydroxyethyl)phosphine.

EXAMPLE VI

*Bis(2,2,2-trichloro-1-hydroxyethyl)phosphine*

The procedure of Example I, above, is repeated in every essential respect using 50 milliliters of an aqueous solution containing 20 grams of sulfuric acid in place of the 50 milliliters of concentrated HCl. The product is bis(2,2,2-trichloro-1-hydroxyethyl)phosphine.

EXAMPLE VII

*Bis(2,2,2-trifluoro-1-hydroxyethyl)phosphine*

The procedure of Example I, above, is repeated in every essential respect except that 22 grams (0.25 mole) of trifluoroacetaldehyde is substituted for chloral hydrate. The product is bis(2,2,2-trifluoro-1-hydroxyethyl)phosphine.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A method of preparing a secondary phosphine having the formula $$\left( R-\underset{\underset{X}{|}}{\overset{\overset{X}{|}}{C}}-CHOH \right)_2 PH$$

wherein X is selected from the group consisting of chlorine and fluorine and R is a member chosen from the group consisting of H, Cl, F, lower alkyl ($C_1$–$C_4$), and monohalo-substituted lower alkyl which comprises reacting, in the presence of an aqueous mineral acid, one mole of phosphine with two moles of an aldehyde conforming to the formula $$R-\underset{\underset{X}{|}}{\overset{\overset{X}{|}}{C}}-CHO$$

wherein X and R have the meaning given above, and recovering the resulting secondary phosphine.

2. The process of claim 1 wherein the aldehyde reactant is chloral and the product is bis(2,2,2-trichloro-1-hydroxyethyl)phosphine.

3. The process of claim 1 wherein the aldehyde reactant is dichloroacetaldehyde and the product is bis(2,2-dichloro-1-hydroxyethyl)phosphine.

4. The process of claim 1 wherein the aldehyde reactant is 2,2,3-trichlorobutyraldehyde and the product is bis(2,2,3-trichloro-1-hydroxybutyl)phosphine.

5. The process of claim 1 wherein the aldehyde reactant is 2,2-dichlorobutyraldehyde and the product is bis(2,2-dichloro-1-hydroxybutyl)phosphine.

6. The process of claim 1 wherein the aldehyde reactant is trifluoroacetaldehyde and the product is bis(2,2,2-trifluoro-1-hydroxyethyl)phosphine.

References Cited in the file of this patent

UNITED STATES PATENTS 2,743,299   Flynn et al. _____ Apr. 24, 1956